US012283815B2

(12) United States Patent
Dresselhuys

(10) Patent No.: US 12,283,815 B2
(45) Date of Patent: Apr. 22, 2025

(54) METHODS AND SYSTEMS FOR MANAGING ENERGY CONSUMPTION OF CRYPTOCURRENCY MINING

(71) Applicant: ESS Tech, Inc., Wilsonville, OR (US)

(72) Inventor: Eric Paul Dresselhuys, Hillsborough, CA (US)

(73) Assignee: ESS TECH, INC., Wilsonville, OR (US)

( * ) Notice: Subject to any disclaimer, the term of this patent is extended or adjusted under 35 U.S.C. 154(b) by 501 days.

(21) Appl. No.: 17/452,931

(22) Filed: Oct. 29, 2021

(65) Prior Publication Data

US 2023/0137653 A1    May 4, 2023

(51) Int. Cl.
*H02J 3/00* (2006.01)
*G06Q 20/06* (2012.01)
*H02J 3/28* (2006.01)

(52) U.S. Cl.
CPC ............ *H02J 3/003* (2020.01); *G06Q 20/065* (2013.01); *H02J 3/28* (2013.01); *G06Q 2220/00* (2013.01)

(58) Field of Classification Search
CPC .......... H02J 3/003; H02J 3/28; H02J 2300/22; H02J 2300/24; H02J 3/008; H02J 3/381; H02J 3/32; G06Q 20/065; G06Q 2220/00; G06Q 30/06; G06Q 40/04; G06Q 50/06
See application file for complete search history.

(56) References Cited

U.S. PATENT DOCUMENTS

| 8,558,510 | B2 | 10/2013 | Moon |
| 10,795,428 | B2 | 10/2020 | Walsh |
| 11,622,468 | B1* | 4/2023 | Welsko ................ H05K 7/1495 165/200 |
| 2016/0033986 | A1* | 2/2016 | Kamel ...................... G05F 1/66 700/295 |
| 2016/0248248 | A1 | 8/2016 | Shim |
| 2017/0249606 | A1* | 8/2017 | Pirooz .................... G06Q 40/02 |
| 2020/0073466 | A1* | 3/2020 | Walsh ..................... G06F 1/263 |
| 2021/0192619 | A1* | 6/2021 | Wu ..................... G06Q 20/0655 |
| 2021/0287309 | A1* | 9/2021 | Gebhardt ............. G05B 13/027 |
| 2022/0134292 | A1 | 5/2022 | Liu et al. |
| 2022/0200030 | A1 | 6/2022 | Liu et al. |
| 2022/0200035 | A1 | 6/2022 | Kender |

(Continued)

FOREIGN PATENT DOCUMENTS

AU    2021106837 A4 * 11/2021    ........... G05B 19/042
EP       3054410 A1    8/2016
(Continued)

OTHER PUBLICATIONS

European Patent Office, Extended European Search Report Issued in Application No. 22195862.2, Apr. 5, 2023, Germany, 6 pages.

*Primary Examiner* — Mohammad Ali
*Assistant Examiner* — Dhruvkumar Patel
(74) *Attorney, Agent, or Firm* — McCoy Russell LLP

(57) ABSTRACT

Systems and methods are provided for managing an energy storage system. In one example, a method may include directing energy stored in the energy storage system to a cryptocurrency mining system and another consumer responsive to conditions. Other consumers may include a third party consumer of energy and conditions may include current and predicted cryptocurrency values and current and predicted availability of cyclically available renewable energy.

20 Claims, 6 Drawing Sheets

(56) References Cited

U.S. PATENT DOCUMENTS

| | | |
|---|---|---|
| 2022/0209274 A1 | 6/2022 | Nicholls et al. |
| 2022/0300394 A1* | 9/2022 | Webber ................. H04L 67/104 |
| 2023/0139514 A1* | 5/2023 | Tennant .................... H02J 3/32 |
| | | 700/291 |
| 2023/0387682 A1* | 11/2023 | Tateiwa ............ H02J 13/00002 |

FOREIGN PATENT DOCUMENTS

| | | | |
|---|---|---|---|
| EP | 4016681 A1 | 6/2022 | |
| JP | 2020202702 A | * 12/2020 | ........... G05B 19/042 |

* cited by examiner

METHODS AND SYSTEMS FOR MANAGING ENERGY CONSUMPTION OF CRYPTOCURRENCY MINING

FIELD

The present description relates generally to cryptocurrency mining and energy storage.

BACKGROUND AND SUMMARY

The economy is currently experiencing the confluence of two megatrends. The first is the emergence of cryptocurrencies and the second is the move to decarbonize the economy through the introduction of renewable sources of energy.

Cryptocurrencies have become a significant economic driver, providing considerable incentives to 'miners' who help drive the currencies' growth through performing complex computing tasks with purpose-build computing systems. There are many competing types of cryptocurrencies, but in all cases participants create (or earn) currency by providing 'proof of work', a 'proof of networking', or similar functions that underpin the core currency.

Although there are differences between currencies, they share one dynamic—they are extremely energy intensive in performing their mining tasks. As more miners join the effort, it becomes increasingly difficult to earn currency, which requires more computing activities to be undertaken to successfully mine currencies. As costs of cryptocurrency mining rise, in large part due to the increased energy costs, the economic payback of conducting mining activities is reduced. Furthermore, there is an increasing social cost to supporting the mining activities, as the power required to mine may be from unsustainable sources such as coal, oil or natural gas, or controversial sources such as nuclear generation.

Renewable energy can provide a partial solution to these issues, but present a different and often competing set of challenges. Wind, solar and other forms of renewables can often provide low cost, carbon-free electricity which may cause a lower overall environmental effect, such as air or water pollution, compared to non-renewable energy sources, but are inherently intermittent in their availability and are required to meet competing energy demands in society. Pricing for renewable energies can vary widely based on time of day, day of week or other outlying factors, such as the variation of solar radiance or wind availability. Renewable energy markets are formed on a state, regional or national level to signal value to generators, which can move from a negative price signal (an energy producer would have to pay a third party to take their energy) to extremely high prices in times of shortage or storm. These market pricing signals are often dynamic, changing on a daily, hourly or in some cases minute by minute basis.

The development of energy storage systems has increased dramatically. Energy storage allows electricity to be stored up in times of abundance, then discharged at times of energy demand, performing a very useful function to the market and end users. The challenge historically is that storage systems are expensive and rely on frequent use to increase their economic value. If a battery or other storage system is installed, but used infrequently, the cost-per-use, what is known as levelized cost of storage, will be high.

In the first case, there have been limited options in addressing the high energy use and cost for cryptocurrency mining. Manufacturers have worked to make equipment more energy efficient, but progress has paled in comparison to the work required of cryptocurrency miners. Some co-location of mining equipment at lower cost energy locations has been tried, however this strategy may have specific applications, for example, for currencies that have geographic specificity.

For energy storage, in addition to general design optimization to reduce costs, the solution has been to seek out the highest-value applications with the highest possibility for frequent use. This has often meant markets and geographies with the highest marginal cost deltas between production costs of energy and market pricing being used for energy storage, which has inherently limited adoption.

Reliance on carbon-based fuel sources have driven increased costs and higher negative environmental effects, such as increased carbon emissions, as a result of increased cryptocurrency mining, leading to some call for limitations or even prohibitions on cryptocurrency mining. In one example, mining may be limited to geographies with very high penetrations of low-carbon energy sources which may output an approximately equal amount of power each day, such as Nordic regions with plentiful hydro energy. For energy storage, adoption will continue to be gated by limited economics, largely focused on areas and applications with the highest economic value. Meanwhile, utilities and other coordinating entities will continue to be forced to dump excess renewable generation when the instantaneous demand is insufficient to create value.

The inventors herein recognize the challenges described above and propose a system and methods for managing an energy storage system, comprising directing stored energy in the energy storage system to a cryptocurrency mining system and another consumer (e.g., any individual or group that consumes energy) responsive to conditions. In this way, by coordinating cryptocurrency mining with energy storage systems, it is possible to take advantage of time-shifting between when energy is generated and when it is consumed, as well as take advantage of selective timing of cryptocurrency mining.

In one example, a cryptocurrency mining device is co-located or physically integrated with an energy storage device which may receive input from low or no-carbon energy sources. Additionally, the cryptocurrency mining device may include or be coupled with a control unit configured with computer-readable instructions stored on non-transitory memory for a method for implementing dynamic and configurable logic to allow increased total returns of cryptocurrency mining. One example method may include alternating use of stored energy and incoming energy for cryptocurrency mining or other uses based on current and predicted values of cryptocurrency and energy. Predicted cryptocurrency economic values and energy values may be determined based on multiple factors including adaptive learning of market conditions, weather forecasts, an estimate of renewable energy availability timing and amount estimates and so on. Further, methods may include operator-set, pre-determined thresholds for extraordinary circumstances (e.g., energy cost/availability that is higher/lower than an expected maximum/minimum) where, when thresholds are exceeded, include overriding programmatic settings of the method (e.g., method for determining percentages of energy to use for mining, storage, discharge) to, for example, backup energy for a home or business is ensured and prioritized over mining activities when an energy grid is down. Further, a method for managing energy consumption of cryptocurrency mining includes decoupling cost and economic value of storage and mining such that a third party operator may sell the value of energy units to a business or individual while the third party operator operates and harvests the value of the cryptocurrency mining for their own benefit or to lower the cost of energy sales. Directing energy for storage and directing energy to the cryptocurrency mining system and the another consumer based on a timing of availability of cyclically available renewable energy may be further responsive to override conditions set by a user. The method may include post-action analysis (e.g., after the determination has been made by the control unit for increased total returns of cryptocurrency mining) by a self-training algorithm, allowing for cost benefit analysis of past actions to be implemented in future management.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

This description and embodiments of the subject matter disclosed herein relate to methods and systems for managing energy storage with energy consumption of cryptocurrency mining, including for example in a system that has renewable energy available with variable timing and/or amounts. Energy management may be achieved in some examples by co-locating an energy storage device with a cryptocurrency mining device, such that energy losses from transferring energy from the energy storage device to the cryptocurrency mining device may be reduced. Additionally, co-location of the cryptocurrency mining device and the energy storage device may allow for energy storage during periods of excess energy production or availability, for example, from a low or no-carbonenergy source, which the cryptocurrency mining device may then use during periods of more scarce energy availability.

Figure 1:
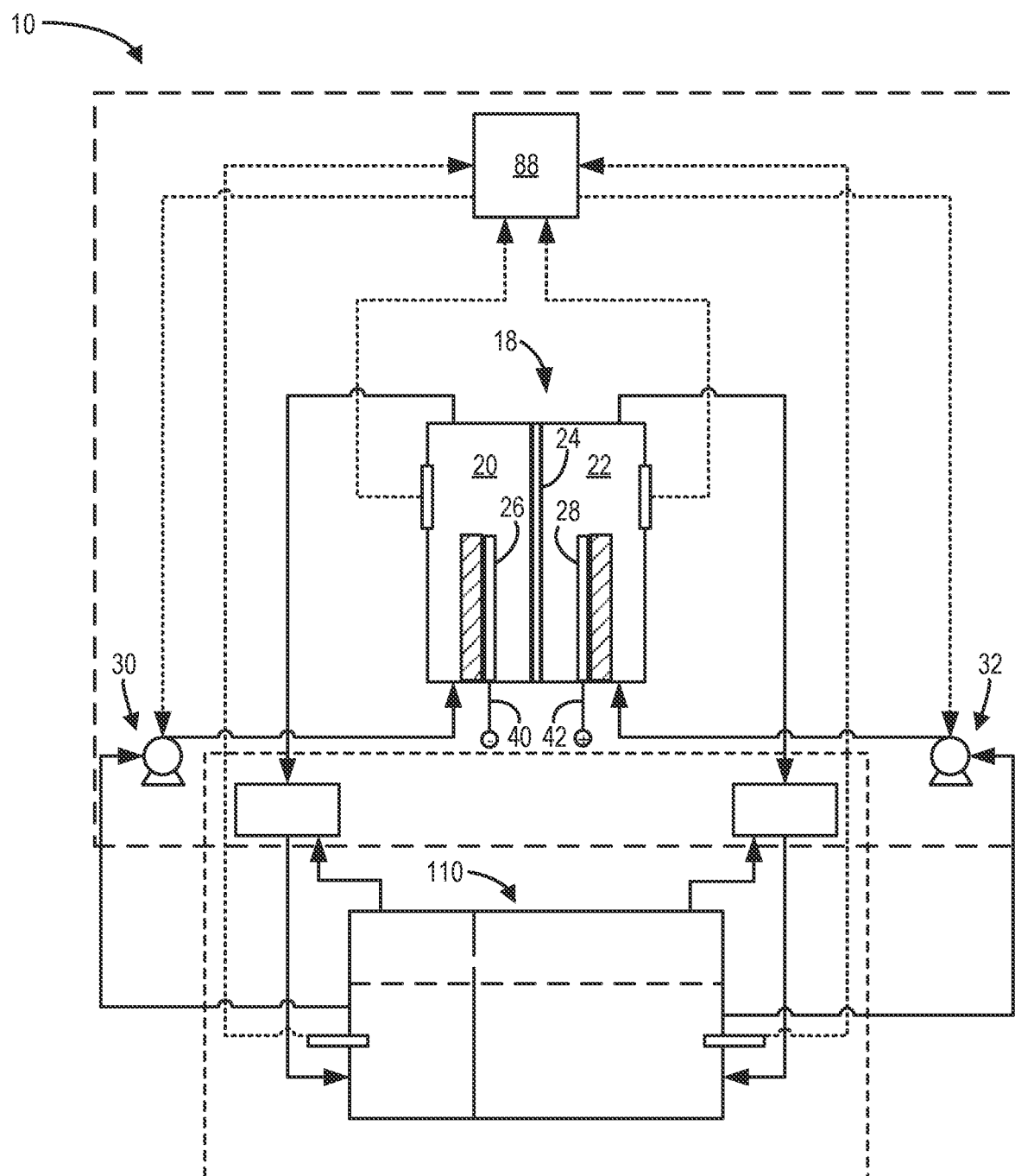
FIG. 1 shows a schematic diagram of an example redox flow battery system, which may be included in a cryptocurrency mining system.
Figure 2:
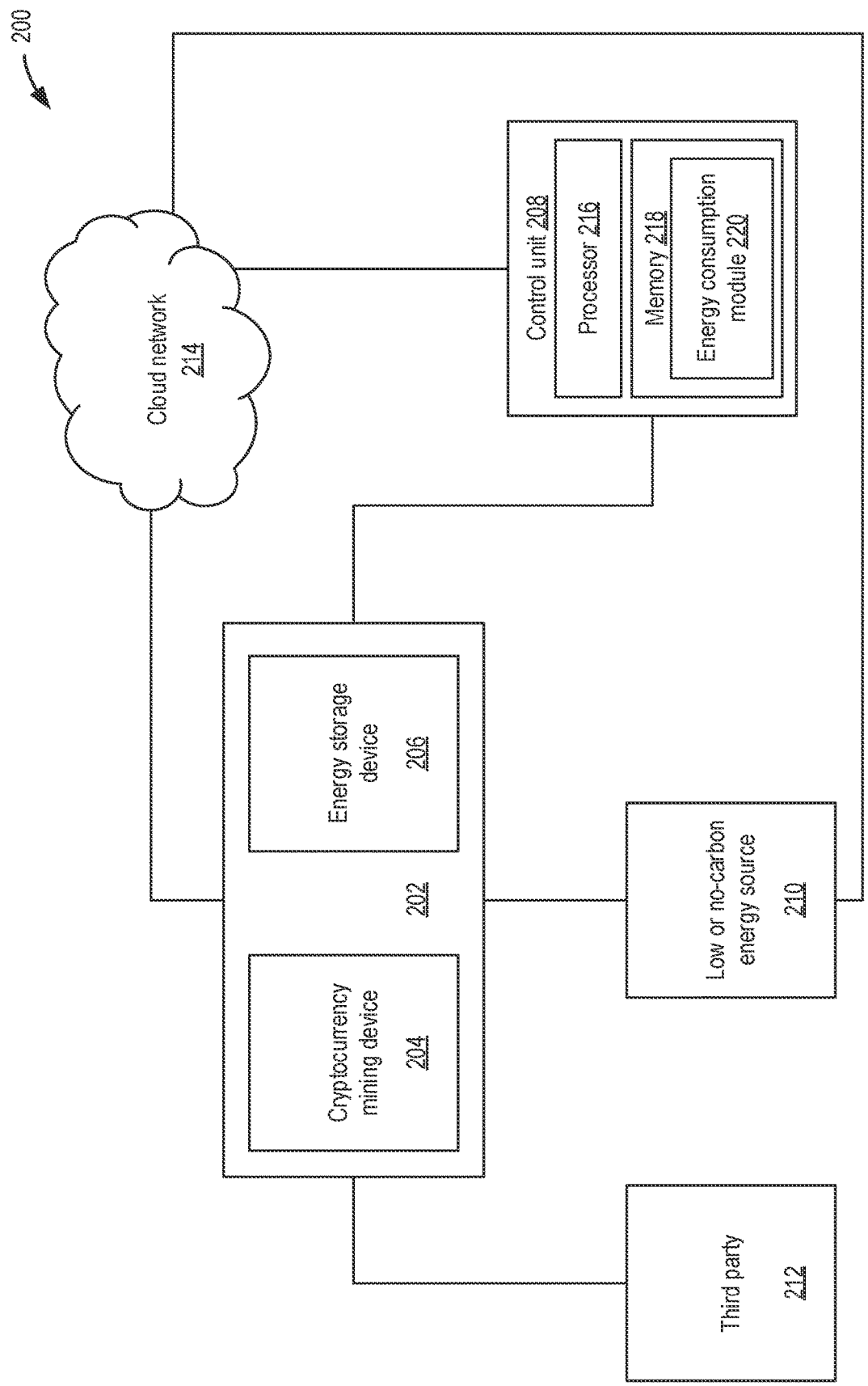
FIG. 2 shows an example energy management system for cryptocurrency mining, which may include the redox flow battery system of FIG. 1.

An example energy storage system is shown in FIG. 1 as a redox flow battery system, which may store electrical energy for use by the cryptocurrency mining device and/or another consumer, such as any individual or group that consumes energy. The redox flow battery system or another energy storage device configured to store electrical energy generated by low or no-carbon energy sources may be co-located with the cryptocurrency mining device and within an energy management system, as shown in FIG. 2. Co-location may refer to a common physical site, such as in a common real-estate property boundary. In some examples co-location may include a common physical building. Alternatively, the redox flow battery system or other energy storage device described above may be physically integrated with the cryptocurrency mining device, for example, where the cryptocurrency mining device and energy storage device are enclosed within a common housing. Together, the energy storage device and the cryptocurrency mining device are referred to herein as a mining system, both when they are co-located and when the energy storage device is physically integrated with the cryptocurrency mining device. The energy management system further includes a control unit linked to the mining system and to a network, such as a cloud network, such that the control unit may receive inputs through the cloud network which may be used in addition to inputs from the mining system by the control unit to send signals to the mining system to manage energy consumption and storage. For example, the cloud network may provide information to the control unit from a remote server regarding current and predicted energy cost, predicted energy demand patterns, and current and predicted cryptocurrency economic value. The control unit may then signal the mining system to distribute incoming energy among the energy storage device, the cryptocurrency mining device, a third party, and dumping energy by grounding procured current, based on a distribution which may manage energy consumption to increase total returns. An example method for distributing energy among elements of the energy management system is shown in FIGS. 3A-3B.

Figure 5:
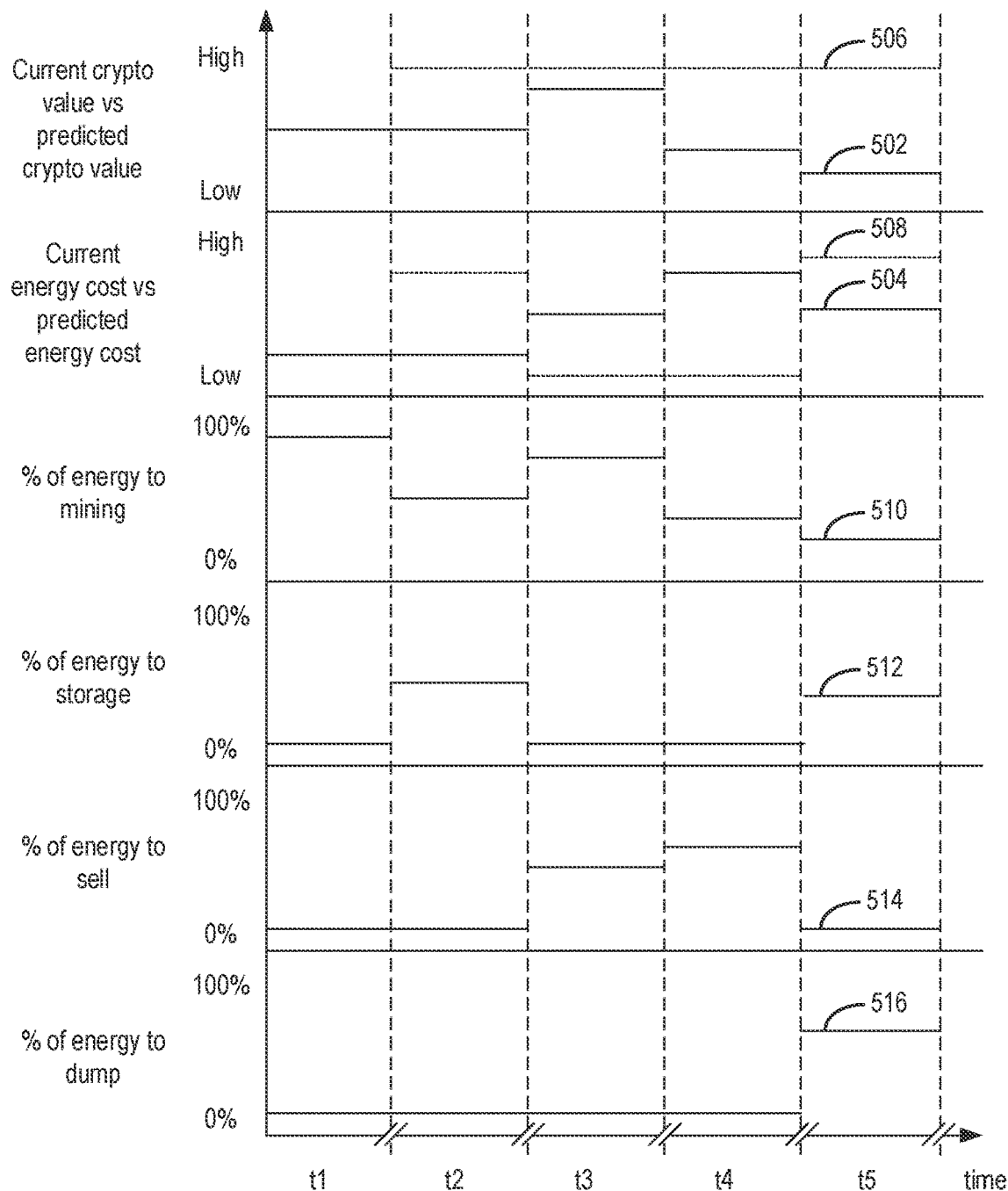
FIG. 5 shows an example timeline illustrating dynamic energy use, according to the method of FIGS. 3A-B.

FIG. 5 shows example distributions of incoming energy among elements of the energy management system, including using incoming energy from an external source (e.g., the low or no-carbon energy source) for mining, or storing energy in the energy storage device, selling energy to a third party, dumping energy to ground, and/or combinations thereof. Different percentages may be distributed to each element depending on inputs to the control unit, such as current and predicted cryptocurrency economic values and current and predicted energy costs (e.g., based on consumer demand patterns). Energy distributions described in FIG. 5 may be the result of implementations of the method of FIGS. 3A-3B.

Additionally or alternatively, the control unit may use inputs from the remote server, via the cloud network, and the mining system to signal the mining system to use energy stored internally (e.g., in the energy storage device) or from the external source, or combinations thereof, which may also enable management of energy consumption and increase total returns. An example method for determining a preferred energy source is described in FIG. 4.

Figure 3A:
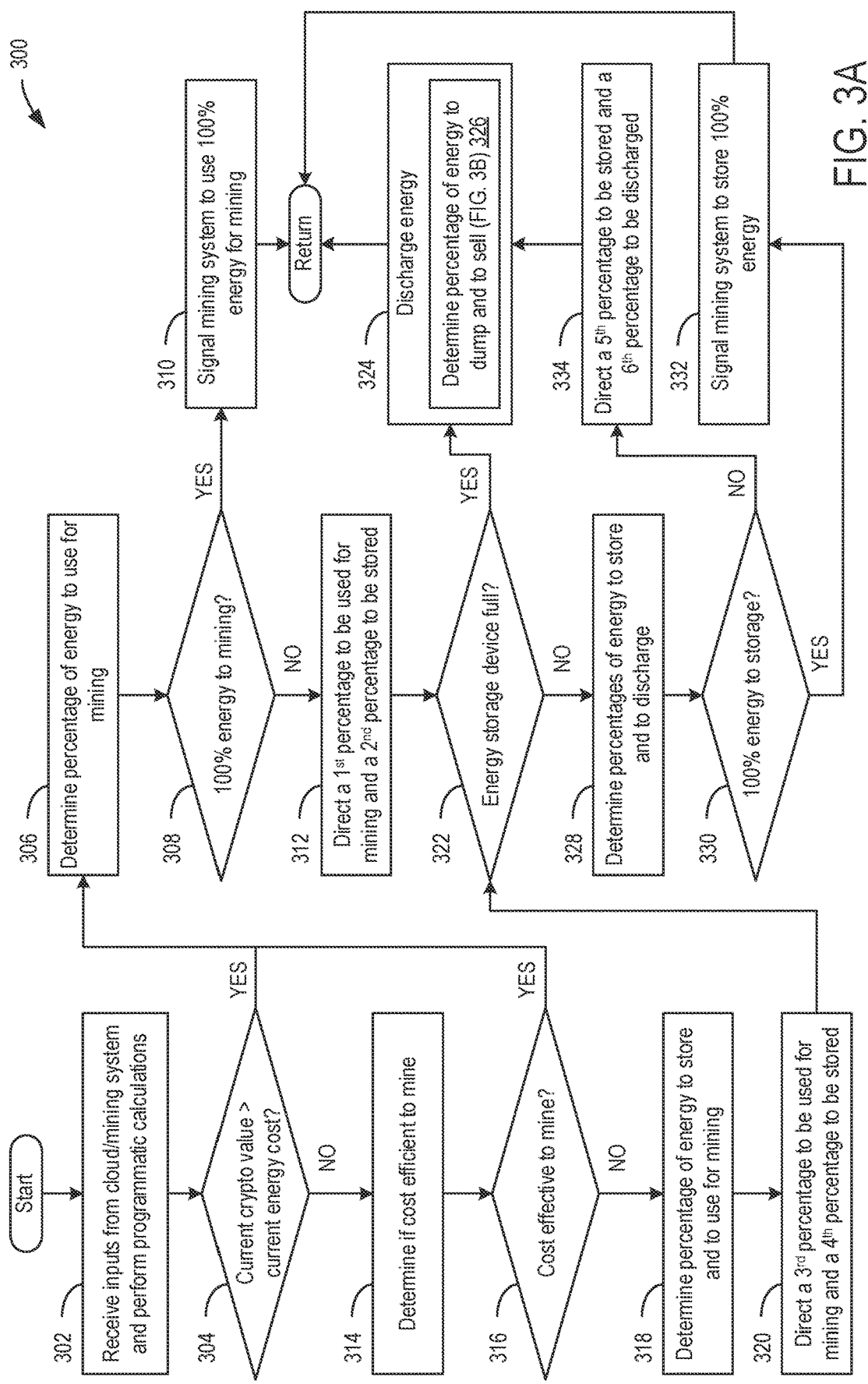
FIG. 3A shows a first part of a first example method for managing energy consumption during cryptocurrency mining, as may be implemented by a control unit of the system of FIG. 2.
Figure 3B:
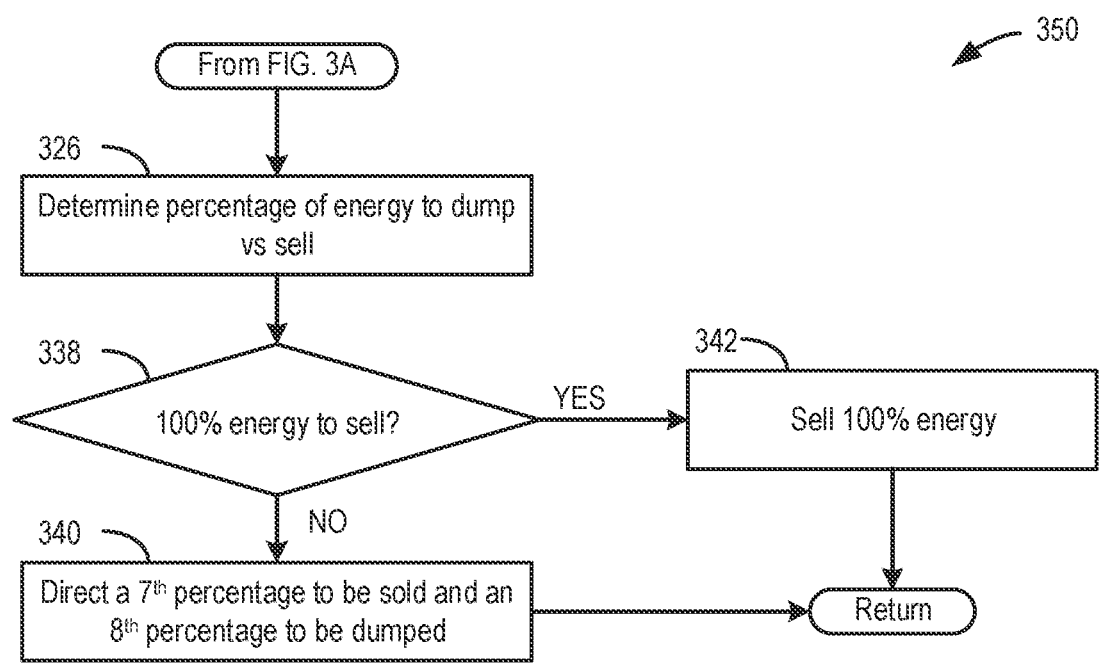
FIG. 3B shows a second part of the first example method for managing energy consumption during cryptocurrency mining, as may be implemented by a control unit of the system of FIG. 2.
Figure 4:
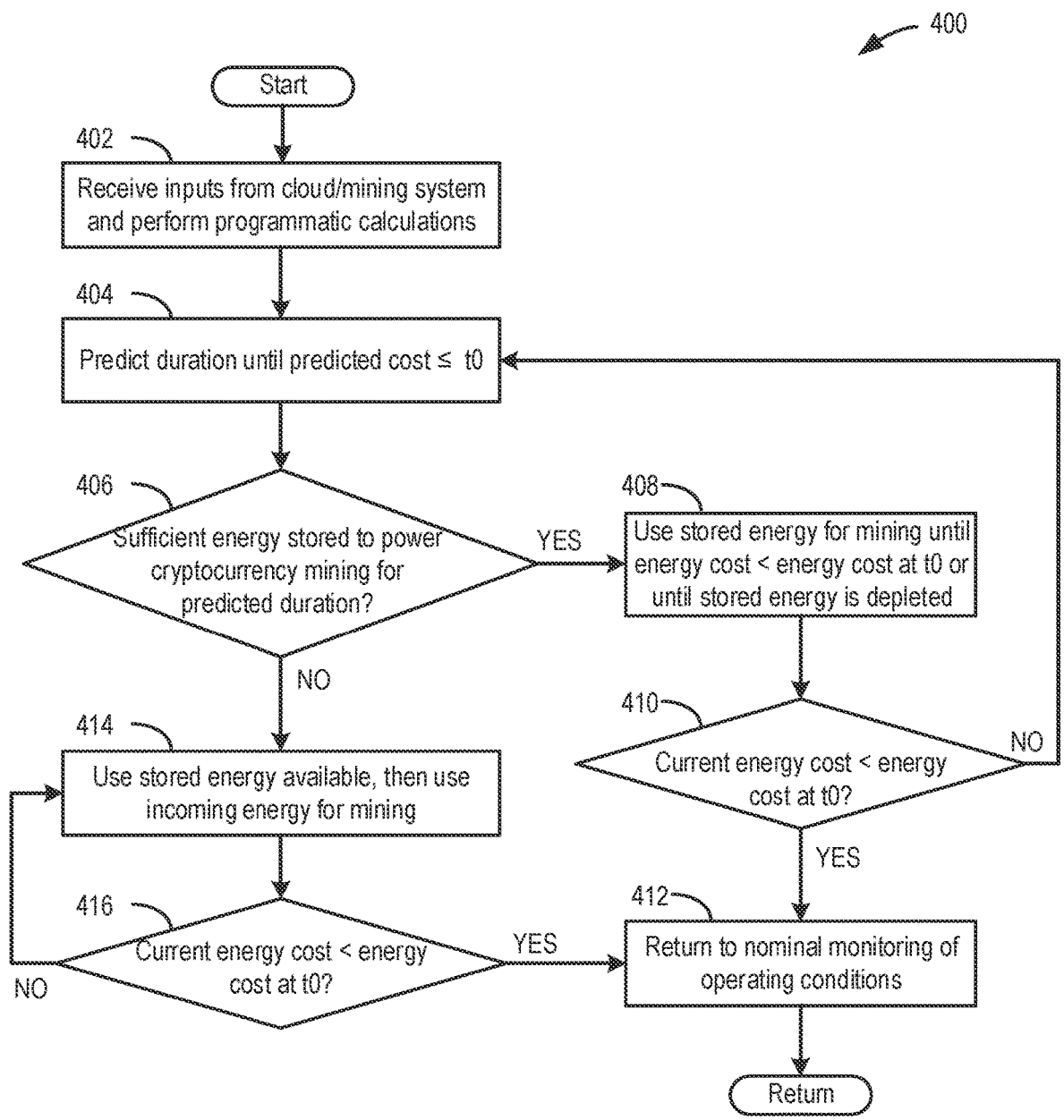
FIG. 4 shows a second example method for managing energy consumption during cryptocurrency mining, as may be implemented by a control unit of the system of FIG. 2.

The methods described in FIGS. 3A-3B and FIG. 4 are examples of methods used to manage energy consumption and increase total returns of cryptocurrency mining, and methods used to achieve this aim are not limited to those described herein.

An example electric energy storage system (e.g., a direct current (DC) power source) is shown in FIG. 1. The electric energy storage system may store electrical energy that is generated via photovoltaic cells, hydroelectric power, wind power, or via chemical energy. The electric energy storage system may output DC power that may be distributed as alternating current AC after a conversion process.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a redox flow battery cell 18 may be referred to as a plating electrolyte, and a positive electrolyte on a redox side (e.g., a positive electrode compartment 22) of the redox flow battery cell 18 may be referred to as a redox electrolyte.

"Anode" refers to an electrode where electroactive material loses electrons and "cathode" refers to an electrode where electroactive material gains electrons. During battery charge, the negative electrolyte gains electrons at the negative electrode 26, and the negative electrode 26 is the cathode of the electrochemical reaction. During battery discharge, the negative electrolyte loses electrons, and the negative electrode 26 is the anode of the electrochemical reaction. Alternatively, during battery discharge, the negative electrolyte and the negative electrode 26 may be respectively referred to as an anolyte and the anode of the electrochemical reaction, while the positive electrolyte and the positive electrode 28 may be respectively referred to as a catholyte and the cathode of the electrochemical reaction. During battery charge, the negative electrolyte and the negative electrode 26 may be respectively referred to as the catholyte and the cathode of the electrochemical reaction, while the positive electrolyte and the positive electrode 28 may be respectively referred to as the anolyte and the anode of the electrochemical reaction. For simplicity, the terms "positive" and "negative" are used herein to refer to the electrodes, electrolytes, and electrode compartments in redox flow battery systems.

One example of a hybrid redox flow battery is an all-iron redox flow battery (IFB), in which the electrolyte includes iron ions in the form of iron salts (e.g., $FeCl_2$, $FeCl_3$, and the like), wherein the negative electrode 26 includes metal iron. For example, at the negative electrode 26, ferrous iron ($Fe^{2+}$) gains two electrons and plates as iron metal ($Fe^0$) onto the negative electrode 26 during battery charge, and $Fe^0$ loses two electrons and re-dissolves as $Fe^{2+}$ during battery discharge. At the positive electrode 28, $Fe^{2+}$ loses an electron to form ferric iron ($Fe^{3+}$) during battery charge, and $Fe^{3+}$ gains an electron to form $Fe^{2+}$ during battery discharge. The electrochemical reaction is summarized in equations (1) and (2), wherein the forward reactions (left to right) indicate electrochemical reactions during battery charge, while the reverse reactions (right to left) indicate electrochemical reactions during battery discharge:

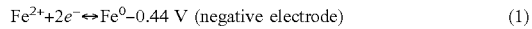

$$Fe^{2+}+2e^- \leftrightarrow Fe^0 -0.44 \text{ V (negative electrode)} \quad (1)$$

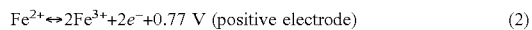

$$Fe^{2+} \leftrightarrow 2Fe^{3+}+2e^- +0.77 \text{ V (positive electrode)} \quad (2)$$

As discussed above, the negative electrolyte used in the IFB may provide a sufficient amount of $Fe^{2+}$ so that, during battery charge, $Fe^{2+}$ may accept two electrons from the negative electrode 26 to form $Fe^0$ and plate onto a substrate. During battery discharge, the plated $Fe^0$ may lose two electrons, ionizing into $Fe^{2+}$ and dissolving back into the electrolyte. An equilibrium potential of the above reaction is $-0.44$ V and this reaction therefore provides a negative terminal for the desired system. On the positive side of the IFB, the electrolyte may provide $Fe^{2+}$ during battery charge which loses an electron and oxidizes to $Fe^{3+}$. During battery discharge, $Fe^{3+}$ provided by the electrolyte becomes $Fe^{2+}$ by absorbing an electron provided by the positive electrode 28. An equilibrium potential of this reaction is $+0.77$ V, creating a positive terminal for the desired system.

The IFB may provide the ability to charge and recharge electrolytes therein in contrast to other battery types utilizing non-regenerating electrolytes. Charge may be achieved by respectively applying an electric current across the negative electrode 26 and positive electrode 28 via a negative battery terminal 40 and a positive battery terminal 42. The negative electrode 26 may be electrically coupled via the negative battery terminal 40 to a negative side of a voltage source so that electrons may be delivered to the negative electrolyte via the positive electrode 28 (e.g., as $Fe^{2+}$ is oxidized to $Fe^{3+}$ in the positive electrolyte in the positive electrode compartment 22). The electrons provided to the negative electrode 26 may reduce the $Fe^{2+}$ in the negative electrolyte to form $Fe^0$ at the (plating) substrate, causing the $Fe^{2+}$ to plate onto the negative electrode 26.

Continuing with FIG. 1, a schematic illustration of the redox flow battery system 10 is shown. The redox flow battery system 10 may include the redox flow battery cell 18 fluidly coupled to an integrated multi-chambered electrolyte storage tank 110. The redox flow battery cell 18 may include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, and as discussed above, the separator 24 may include an ion-exchange membrane and/or a microporous membrane.

The negative electrode compartment 20 may include the negative electrode 26, and the negative electrolyte may include electroactive materials. The positive electrode compartment 22 may include the positive electrode 28, and the positive electrolyte may include electroactive materials. In some examples, multiple redox flow battery cells 18 may be combined in series or in parallel to generate a higher voltage or electric current in the redox flow battery system 10.

Further illustrated in FIG. 1 are negative and positive electrolyte pumps 30 and 32, both used to pump electrolyte solution through the redox flow battery system 10. Electrolytes are stored in one or more tanks external to the cell, and are pumped via the negative and positive electrolyte pumps 30 and 32 through the negative electrode compartment 20 side and the positive electrode compartment 22 side of the redox flow battery cell 18, respectively.

As illustrated in FIG. 1, the redox flow battery cell 18 may further include the negative battery terminal 40 and the positive battery terminal 42. When a charge current is applied to the negative battery terminal 40 and positive battery terminal 42, the positive electrolyte may be oxidized (loses one or more electrons) at the positive electrode 28, and the negative electrolyte may be reduced (gains one or more electrons) at the negative electrode 26. During battery discharge, reverse redox reactions may occur on the negative electrode 26 and positive electrode 28. In other words, the positive electrolyte may be reduced (gains one or more electrons) at the positive electrode 28, and the negative electrolyte may be oxidized (loses one or more electrons) at the negative electrode 26. An electrical potential difference across the battery may be maintained by the electrochemical redox reactions in the positive electrode compartment 22 and the negative electrode compartment 20, and may induce an electric current through a current collector while the reactions are sustained. An amount of energy stored by a redox battery may be limited by an amount of electroactive material available in electrolytes for discharge, depending on a total volume of electrolytes and a solubility of the electroactive materials.

The controller 88 may further execute control schemes based on an operating mode of the redox flow battery system 10. For example, as discussed in detail below with reference to FIGS. 2, 3A, 3B, and 4, the controller 88 may be directed by a control unit of an energy management system to charge or discharge the redox flow battery cell 18. Additionally or alternatively, the controller 88 may be excluded in the energy management system and control schemes may be executed directly by the control unit of the energy management system.

Referring now to FIG. 2, an example energy management system 200 is shown. The energy management system 200 includes a mining system 202 configured with a cryptocurrency mining device 204 and an energy storage device 206, a control unit 208, a low or no-carbon energy source 210, a third party 212, and a cloud network 214.

The mining system 202 as shown in FIG. 2 encompassing the cryptocurrency mining device 204 and the energy storage device 206 may indicate that the energy storage device 206 is physically integrated with the cryptocurrency mining device 204, in one example. In another example, the mining system 202 indicates that the energy storage device 206 and the cryptocurrency mining device 204 are co-located, for example, within a same room, building, region, and so on. Co-location of the cryptocurrency mining device 204 and the energy storage device 206 may be defined as a distance therebetween such that power loss from transmitting energy to the cryptocurrency mining device 204 from the energy storage device 206 might not affect cryptocurrency mining operation.

The cryptocurrency mining device 204 may be referred to as a node and, in one example, is a computer dedicated to cryptocurrency mining and owned by an owner of the energy storage device 206. In another example, the cryptocurrency mining device 204 may be owned by an owner other than the owner of the energy storage device 206. The cryptocurrency mining device 204 may be configured with a graphics processing unit (GPU) and/or an application-specific integrated circuit (ASIC) for solving complex mathematic problems (e.g., generating hashes) to validate transactions and add to the blockchain, otherwise known as mining cryptocurrency.

The energy storage device 206 may be, in one example, a flow battery, such as shown in the flow battery system of FIG. 1. The energy storage device 206 may be, in other examples, an iron flow, lithium ion, vanadium or any other battery chemistry. Alternatively, the energy storage device 206 may be a fuel cell.

In one example, the energy storage device 206 may be sold to the third party 212 (e.g., an end user of energy) by a provider, allowing the end user to use energy stored by the energy storage device 206 that is not being used by the cryptocurrency mining device 204. The energy storage device 206 may remain physically integrated with the cryptocurrency mining device 204 or may be moved to a location within the co-located region, as described above. The provider (e.g., owner of the cryptocurrency mining device 204) may implement user settings to operate the cryptocurrency mining device 204 using energy that is being input to the mining system 202 from the low or no-carbon energy source 210 (e.g., directly routed to the cryptocurrency mining device 204) or using energy in the energy storage device 206 that not being used by the end user. Energy storage devices may be expensive, for example, a cost-per-use (e.g., levelized cost of storage) for the energy storage device 206 may be high if the energy storage device 206 is used infrequently. By selling the energy storage device 206 to the end user and using energy not being used by the end user for cryptocurrency mining, the provider may reduce incurred costs. As compensation for using the energy storage device 206 owned by the end user for cryptocurrency mining, the provider may share a percentage of the value of cryptocurrency generated with the owner (e.g., the end user) of the energy storage device 206.

In another example, the third party 212 may be a business or an individual to which an operator of the mining system 202 sells the value of energy units. The operator of the mining system 202 may then operate and harvest the value of the cryptocurrency mining for their own benefit or to lower the cost of energy sales. Selling of energy units is further described in FIGS. 3A-3B.

Energy is input to the mining system 202 from the low or no-carbon energy source 210. For example, the low or no-carbon energy source 210 may be solar power, wind power, hydro-electric power, and so on. This may allow for a low or a no-carbon mining of cryptocurrency. In one example, the low or no-carbon energy source 210 may be owned by an owner of the mining system 202 (e.g., the cryptocurrency mining device 204 and the energy storage device 206 or just the cryptocurrency mining device 204). Alternatively, the low or no-carbon energy source 210 may be owned by an owner other than the owner of the mining system 202 and the owner of the mining system 202 may purchase, or receive for no cost, energy from the low or no-carbon energy source 210. Cost of energy and buying/selling of energy is further described in FIGS. 3A-3B.

Energy from the low or no-carbon energy source 210 may be directly input into the cryptocurrency mining device 204 to be used for cryptocurrency mining. In another example, energy may first be routed through the energy storage device 206 before being delivered to the cryptocurrency mining device 204. Energy from the low or no-carbon energy source 210 may remain in the energy storage device 206 for a duration before being routed to the cryptocurrency mining device 204 or being routed to another element, for example, the third party 212, to discharge energy from the mining system 202. In one example, when energy is input from the low or no-carbon energy source 210, a first percentage of energy may be routed to the cryptocurrency mining device 204, a second percentage of energy may be routed to the energy storage device 206, and a third percentage of energy may be routed to the third party 212. The percentages of energy to be routed to the cryptocurrency mining device 204, to the energy storage device 206, or to the third party 212 may be determined based on cryptocurrency economic value, storage availability, energy cost, consumer demand for energy, and so on. A method for determining relative percentages of energy to route to various elements of the energy management system 200 are further described in FIGS. 3A-3B. A method for determining whether to use direct input energy from the low or no-carbon energy source 210 or energy from the energy storage device 206 for cryptocurrency mining is further described in FIG. 4.

The percentages of energy routed to components of the energy management system 200, a source of energy to be used for cryptocurrency mining, and other decisions made to manage energy consumption for cryptocurrency mining may be determined by the control unit 208. The control unit 208 may be configured with a processor 216 (e.g., central processing unit (CPU), control logic, non-transitory memory, and so on) and memory 218 including an energy consumption module 220. The control unit 208 may further be configured with computer-readable instructions stored on non-transitory memory that when executed cause the control unit to adjust energy flow from the low or no-carbon energy source 210 to each of the third party 212, the energy storage device 206, and the cryptocurrency mining device 204 based on user settings, at least one operating condition of the mining system 202, and renewable energy source availability. Information may be received by the control unit 208 from external sources, such as from a remote server via the cloud network 214, and from internal sources, such as the mining system 202. Such information may be processed using the energy consumption module 220 to determine settings that may be used by the mining system 202 to manage energy consumption during cryptocurrency mining.

The control unit 208 may be coupled to the cloud network 214 via wired (e.g., ethernet) or wireless communication such that the control unit 208 may receive information from the remote server, the internet or other public domains and use received information to manage energy consumption of the mining system 202. For example, the cloud network 214 may relay to the control unit 208 information including renewable energy source (e.g., low or no-carbon energy) availability, market prices for energy, forecasted localized energy demands (e.g., for consumers other than the mining system 202, such as energy used by individuals/businesses to power homes/offices), expected cryptocurrency mining yield, current cryptocurrency pricing, expected future cryptocurrency pricing, and so on.

The control unit 208 may be in remote communication (e.g., wired or wireless connection) with the mining system 202 or may be co-localized and in communication with the mining system 202 via a network (e.g., wired or wireless connection). The mining system 202 may relay local data inputs to the control unit 208, which may include a status of the energy storage device 206 (e.g., percentage of energy storage device 206 available for storage), operating constraints of the cryptocurrency mining device 204 (e.g., temperature of the cryptocurrency mining device 204), mining efficiency (e.g., how many energy units are being used to mine one cryptocurrency unit), and so on.

Based on the information inputs from the cloud network 214 and the mining system 202, the control unit 208 may perform functions to manage energy consumption of cryptocurrency mining. For example, the energy consumption module 220 may learn patterns of cyclically available renewable energy, energy consumption (e.g., consumer demand) and associated energy costs based on consumer demand and renewable energy source availability during different seasons or times of day, patterns of renewable energy availability during weather events (e.g., more solar power available when sunny, less available when cloud coverage), and other renewable energy source availability information. The energy consumption module 220 may then generate algorithms based on learned patterns which are then used to provide signals to the mining system 202 to manage energy consumption.

For example, the control unit 208 may direct the cryptocurrency mining device 204 to start or stop mining. Cryptocurrency mining may be done using power from the low or no-carbon energy source 210 or from the energy storage device 206, as directed by signals from the control unit 208 and described in FIG. 4. Additionally, the control unit 208 may direct the mining system 202 to store energy from the low or no-carbon energy source 210 in the energy storage device 206 (e.g., charge the energy storage device 206), to sell energy to the third party 212 (e.g., to discharge energy stored in the energy storage device 206 to a power grid or consumer) or to dump energy, either to the third party 212, to the low or no-carbon energy source 210, or to ground. The energy consumption module 220 may determine percentages of total energy (e.g., available energy for storage/cyclically available renewable energy) from the low or no-carbon energy source 210 to be directed to each of the above described elements, to be further described in FIGS. 3A-3B. Determined percentage distribution of total energy may be based on adaptive learning of timing of availability and an available amount of the cyclically available renewable energy, and adaptive learning of timing of demand and a demand amount of the cryptocurrency mining system and the another consumer, as further described in FIGS. 3A-3B.

FIGS. 3A-3B show a first example method 300 for managing energy consumption during cryptocurrency mining by determining percentages of incoming energy to use for mining and to be stored, dumped, or sold based on third party and system conditions. Method 300 describes actions of a control unit to direct incoming energy from an energy source, for example, the low or no-carbon energy source 210 of FIG. 2. Instructions for carrying out method 300 and the rest of the methods described herein may be executed by the control unit based on computer-readable instructions stored on non-transitory memory of the control unit, for example, the energy consumption module 220, and in conjunction with information received from a remote server, the internet, or other public domains (e.g., via the cloud network 214) and from a mining system, such as the mining system 202 of FIG. 2. The control unit may send signals to the mining system to adjust energy distribution and mining action of the mining system, according to the method described below. Energy distribution (e.g., energy flow to each consumer) described in method 300 is described in reference to incoming energy (e.g., cyclically available renewable energy) from an external source, such as the low or no-carbon energy source, as described in FIG. 2. Method 300 may also be applicable to other external energy sources. Distribution of energy from an internal energy source, such as the energy storage device as described in FIG. 2, and from an external energy source are described in FIG. 4.

At 302, method 300 includes receiving inputs via the cloud network and from the mining system and performing programmatic calculations. Inputs from the cloud network may include conditional inputs, such as current and predicted weather, estimate of energy availability for storage, current and predicted cryptocurrency economic value, current and predicted energy market price, current power demand, predicted power demand patterns, and so on. Localized data input from the mining system, as described above in FIG. 2, may include an energy storage status and operating constraints. The mining system may also input to the control unit information regarding expected cryptocurrency mining yield and forecasted energy demands. Performing programmatic calculations may include using received inputs, such as current and predicted weather and historic power demands during different weather events, to predict a future energy cost.

At 304, method 300 includes determining if a current value of cryptocurrency is greater than a current energy cost. For example, a dollar amount conversion of one cryptocurrency unit may be greater than a cost of the units of energy used to mine the one cryptocurrency unit.

If, at 304, it is determined that current cryptocurrency values are greater than current energy cost, cryptocurrency mining may proceed. At 306, method 300 includes determining a percentage of incoming energy to be used by a cryptocurrency miner (e.g., the cryptocurrency mining device 204 of FIG. 2) for cryptocurrency mining.

The percentage of incoming energy to be used for cryptocurrency mining may be determined based on multiple factors, including inputs from the cloud network and mining system and resulting programmatic calculations as described at 302. In one example, logic used to determine the percentage of energy to use for mining is configurable, where the user (e.g., owner of the cryptocurrency mining device) may input user settings or an override of method 300 to direct the control unit to route 100% of input energy to the mining device for cryptocurrency mining, which may result in increased total returns on cryptocurrency compared to when less than 100% of input energy is routed to the mining device. Additionally, the logic may determine percentages of energy to use for cryptocurrency mining based on inputs, e.g., comparing current/predicted cryptocurrency values and current/predicted energy costs as input at 302. The logic used for determining the percentage of energy to use for mining is dynamic, and increasing total returns on input energy may include distributing incoming energy for multiple purposes, including for cryptocurrency mining, energy storage, or discharging energy. The logic may be a remote processing or game theory of possible outcomes of different energy distribution percentages to determine a distribution where total returns are increased. A Monte Carlo-style simulation and advanced analytics may be used to determine an optimal outcome, for example, where the highest amount of cryptocurrency is mined for the lowest cost of energy. In this way, cryptocurrency mining returns may be increased (e.g., greater) when less than 100% of input energy is routed to the mining device.

If, at 308, it is determined that 100% of energy is directed to cryptocurrency mining, at 310, the controller may signal to the mining system to use 100% of incoming energy for cryptocurrency mining. For example, this may include directing 100% of incoming energy to the cryptocurrency mining device. Method 300 returns to 302 to continue monitoring conditions and determine which conditions may result in increased returns on cryptocurrency mining.

If, at 308, it is determined that less than 100% of incoming energy is to be used for cryptocurrency mining, method 300 proceeds to 312. At 312, method 300 includes using a first percentage of the total incoming energy for cryptocurrency mining, e.g., directing the first percentage of energy to the cryptocurrency mining device, and directing a second percentage of total incoming energy to be stored in the energy storage device, as described in FIG. 2. The first percentage may be a quantity of energy such that at least a minimum quantity of cryptocurrency may be mined, the minimum quantity having been set by a user of the mining device, a manufacturer of the mining device, a governing agency, and so on. Residual energy not used for mining may be stored in the energy storage device to be used for cryptocurrency mining at a later time, as further described in FIG. 5.

Values of the first percentage and the second percentage are determined at 306 based on received inputs and programmatic calculations, as described at 302. For example, the first percentage of energy (e.g., to be used for cryptocurrency mining) may be greater than the second percentage of energy (e.g., to be stored) when the current energy cost is less than the predicted energy cost. In this example, more energy is used for cryptocurrency mining, as generating cryptocurrency is the main purpose of the cryptocurrency mining system. Additionally, as the energy cost is predicted to increase, energy is also stored so that a lesser quantity of higher-costing energy may be purchased in the future to maintain a current cryptocurrency mining rate. Further examples of energy distribution percentages are described in FIG. 5.

At 322, method 300 includes determining if the energy storage device is full. For example, when the control unit directs the second percentage of total energy to the energy storage device, as described at 312, the energy storage device might not have capacity to store more energy. Energy storage and capacity are described in FIG. 1 for the energy storage device as a redox flow battery.

If the energy storage device is determined to be full, at 324, method 300 includes discharging energy, for example, the second percentage of energy intended to be stored. Discharging energy may include, at 326, determining a percentage of energy (e.g., a percentage of the second percentage of energy from 312) to dump or to sell, as further described in FIG. 3B.

Returning to 322, if it is determined the energy storage device is not full, at 328, method 300 includes determining a percentage of energy (e.g., a percentage of the second percentage of energy from 312) to store or to discharge. Logic used to determine the percentages of energy to store and to discharge may be the same logic used to determine the percentage of energy to store and to use for mining. For example, the logic may use adaptive learning to compare current and predicted costs of energy, current and predicted values of cryptocurrency, weather conditions, historic power demands, current and predicted renewable energy source availability, an estimate of renewable energy availability timing, other renewable energy source availability information, and so on to determine conditions for increased total returns of cryptocurrency mining. A fifth percentage of energy may be directed to be stored and a sixth percentage of energy may be directed to be discharged. The fifth percentage and the sixth percentage are percentages of the second percentage determined at 312.

In addition to the logic described above, the values of the fifth percentage and the sixth percentage may be based on an available amount of storage in the energy storage device. For example, the fifth percentage may be equal to the available amount of storage and the sixth percentage may be the remaining amount of energy (e.g., the second percentage of energy minus the fifth percentage of energy). If the amount of available storage is greater than or equal to the second percentage, the fifth percentage may be 100% of the second percentage, e.g., the second percentage of total input energy may be stored, and the sixth percentage may be 0%.

Based on the percentages determined at 328, at 330, method 300 includes determining if 100% of energy is to be directed to storage. For example, 100% of energy may be 100% of the second percentage determined to be stored at 312. If, at 330, it is determined that 100% of energy (e.g., a quantity of energy equal to the second percentage) is to be directed to the energy storage device, at 332 the control unit may signal the mining system to store the second percentage of incoming energy in the energy storage device. Method 300 returns to 302 to continue monitoring conditions and determine conditions for increased returns on cryptocurrency mining.

If, at 330, it is determined that less than 100% of energy (e.g., less than the second percentage) is to be stored, method 300 proceeds to 334, where method 300 includes directing the fifth percentage of energy to be stored and directing the sixth percentage of energy to be discharged. Directing the fifth percentage of energy to be stored may include the control unit signaling to the mining system to direct the fifth percentage of energy to the energy storage device and directing the sixth percentage of energy to the third party or to ground, as briefly described in FIG. 2 and further described below. Under some conditions, for example, when a predicted cost of energy is less than a current cost of energy, the fifth percentage of energy may be less than the sixth percentage of energy. In another example, the fifth percentage of energy may be greater than or equal to the sixth percentage of energy. Further examples of relative values for the fifth percentage and the sixth percentage are described in FIG. 5.

Method 300 proceeds from 334 to 324 where, as described above, method 300 includes discharging energy. Discharging energy includes determining percentages of remaining energy to dump and to sell at 326, as further described in FIG. 3B.

Turning now to FIG. 3B, a second part 350 of method 300 includes determining percentage of energy to dump and to sell at 326. Logic used to determine the percentages of energy to dump and to sell may be the same logic used to determine the percentage of energy to discharge, to store, and to use for mining. For example, the logic may compare current and predicted costs of energy, estimate of energy availability for storage, an estimate of renewable energy availability timing, current and predicted value of cryptocurrency, weather conditions, historic power demands, and so on to determine conditions for increased total returns. A seventh percentage may be directed to be sold and an eighth percentage may be directed to be dumped (e.g., to ground or to the power grid). The seventh percentage and the eighth percentage are percentages of the sixth percentage determined at 328 of FIG. 3A, where values of the seventh percentage and the eighth percentage sum to the total value of the sixth percentage.

For example, if the current cost of energy is high, the energy storage device is full, and the predicted energy cost is lower than the current energy cost, the logic may determine that total returns of cryptocurrency mining may be increased by selling incoming energy and using stored energy for cryptocurrency mining, as further described in FIG. 4. In this example, the seventh percentage may be 100% of the sixth percentage.

If, at 338 of FIG. 3B, it is determined that 100% of the energy (e.g., 100% of the sixth percentage of energy) is to be sold, method 300 proceeds to 342, where the control unit may signal to the mining system to sell 100% of the energy. Energy may be sold to a third party, as described in FIG. 2, including a power company, a consumer such as an individual or a business, or other energy user. Method 300 returns to 302 of FIG. 3A to continue monitoring conditions and determine conditions for increased returns on cryptocurrency mining.

If, at 338, it is determined that less than 100% of the energy is to be sold, method 300 proceeds to 340, where the control unit may direct the seventh percentage to be sold and the eighth percentage to be dumped. Directing the seventh percentage to be sold may include the control unit signaling to the mining system to sell the seventh percentage to the third party, as described above. Directing the eighth percentage to be dumped may include the control unit signaling to the mining system to dump the eighth percentage to ground or to the power grid. In conditions where it would be costly to discharge energy to the third party (e.g., the owner of the mining system would pay power companies to take energy not being used for mining or storage), it may be more profitable to the owner of the mining system to dump energy to ground. In this example, the eighth percentage may be 100% of energy (e.g., 100% of the sixth percentage). Further examples of relative values for the seventh percentage and the eighth percentage are described in FIG. 5. Method 300 returns to 302 of FIG. 3A to continue monitoring conditions and determine conditions for increased returns on cryptocurrency mining.

Returning to FIG. 3A, if at 304 it is determined that the current cryptocurrency value is not greater than the current energy cost, method 300 proceeds to 314, where method 300 includes determining if it is cost efficient to mine cryptocurrency. For example, though the current energy cost is greater than the current cryptocurrency value and therefore it may by cost ineffective (e.g., cost more money to mine cryptocurrency than is being made from the mined cryptocurrency), this may be cost effective in the long term, as cryptocurrency values may be predicted to increase and be greater than the current energy cost. Other examples of short term investments (e.g., mining cryptocurrency when current energy cost is greater than current cryptocurrency value) may be financially beneficial in the long term (e.g., when predicted cryptocurrency values are greater than current cryptocurrency values). Determining cost efficiency may include using logic similar to the logic used to determine percentages of energy to use for storage, mining, or to dump, as described above. In one example, results from programmatic calculations and input from the cloud network may be compared to cryptocurrency mining yield from prior mining events conducted under similar conditions, such as weather, mining device temperature, energy cost, and so on.

If it is determined at 316 to be cost effective to mine using input energy, method 300 proceeds to 306 to determine a percentage of energy to use for mining, as described above. If, at 316, it is determined that it is not cost effective to mine cryptocurrency under the current circumstances, method 300 proceeds to 318 where method 300 include determining a percentage of energy to use for mining cryptocurrency and a percentage of energy to store.

As the purpose of the mining system is to mine cryptocurrency, the mining system may continue mining even when it may be cost ineffective to mine. In one example, a rate of cryptocurrency mining may be decreased and set by the control unit to not exceed a threshold, where the threshold may be a rate above which a cost to mine exceeds a value set by the mining system owner, manufacturer, a governing agency, and so on. In another example, a cap may be set on the number of cryptocurrency units mined until it is determined to be cost effective to mine. The percentage of energy to be used for mining at 318 may therefore be less than the percentage of energy to be used for mining at 306. Further examples of values to be used for mining and for storage are described in FIG. 5.

At 320, method 300 includes directing a third percentage of total input energy to be used for mining and a fourth percentage to be stored. As described above, the third percentage may be less than the first percentage. Directing the third percentage to be used for mining may include the control unit signaling the mining device to use the third percentage of total energy (e.g., input from the low or no-carbon energy source) for cryptocurrency mining. Directing the fourth percentage of energy to be stored may include the control unit signaling to the mining system to direct the fourth percentage of energy to the energy storage device. Method 300 proceeds to 322 to determine if the energy storage device is full, and proceeds through subsequent steps as described above.

Method 300 may be constantly implemented to monitor conditions, e.g., via inputs at 302, and continuously performing calculations and other logic decisions to determine percentages of energy distributions that provide increased total returns compared to non-distributed energy (e.g., 100% of energy to mining or 100% of energy to storage). The control unit may apply and adjust signals to the mining system to adjust percentages and manage energy consumption by the mining system, for example, adjusting percentages so the highest amount of cryptocurrency is mined for the lowest cost of energy.

In another example, method 300 may be performed at regular intervals, such as at five minute intervals, hour intervals, six hour intervals, and so on. As described in FIGS. 3A-3B, method 300 may be applied to distribute energy input from an external source, such as the low or no-carbon energy source. However, method 300 may also be applied to distribute energy stored in the energy storage device. As energy storage devices allow for time-shifting between when energy is generated and when it is consumed, method 300 may be applied such that, based on inputs from the mining system and from the cloud network, the control unit may determine a percentage of energy stored in the energy storage device to be used for cryptocurrency mining, a percentage of energy to remain stored in the energy storage device, a percentage of energy to be sold, and a percentage of energy to be dumped to ground.

FIG. 4 shows a second example method 400 for managing energy consumption during cryptocurrency mining by determining a source of energy to use for cryptocurrency mining. Cryptocurrency mining may be powered internally by energy stored in an energy storage device, such as described in FIG. 2, or may be powered externally by a low or no-carbon energy source, also as described in FIG. 2. Method 400 as described below is implemented when current energy costs are predicted by the control unit to be greater than predicted energy costs. Method 400 may also be applied to other conditions where internally stored energy or energy from an external source may be available for use in cryptocurrency mining. For example, method 400 may be implemented by a user inputting user settings to override the control unit and direct the cryptocurrency mining device to use stored energy prior to using incoming energy (e.g., from a renewable energy source), thus implementing method 400 where the control unit may implement a different method. Additionally or alternatively, the user may input user settings to override method 400 and implement a different method for distributing stored energy among the third party, the energy storage device, and so on.

At 402, method 400 includes receiving inputs from the cloud network (e.g., from a remote server, the internet, or other public domain) and from the mining system and performing programmatic calculations. Inputs may include conditional inputs, such as current and predicted weather, current and predicted cryptocurrency value, current and predicted energy market price, current and predicted consumer demand patterns, current and predicted cryptocurrency mining demand amount, and so on. Localized data input from the mining system, as described above in FIG. 2, may include an energy storage status and mining device operating constraints. The mining system may also input to the control unit information regarding expected cryptocurrency mining yield and forecasted energy demands. Performing programmatic calculations may include using received inputs, such as current and predicted weather and historic power demands during different times of day or year, to predict a future energy cost.

At 404, method 400 includes predicting a duration until the predicted energy cost is less than or equal to the current energy cost (e.g., at time t0). For example, the control unit may predict that energy costs at time t1 will equal energy costs at time t0, where the duration is the time between t0 and t1. The duration may be predicted based on inputs received at 402, and the prediction may include learning energy demand patterns (e.g., based on past weather/temperature, trends during time of day/week/year, and so on), predicting energy cost based on predictions in weather/temperature, demand trends, and so on.

At 406, method 400 includes determining if sufficient energy is stored (e.g., in the energy storage device) to power cryptocurrency mining for the predicted duration. Powering cryptocurrency mining may include adjusting among internal and external energy sources used for cryptocurrency mining to give a desired output (e.g., a demand amount of cryptocurrency) until predicted energy costs are less than or equal to current energy costs. In one example, powering cryptocurrency mining may include maintaining a current rate of cryptocurrency mining (e.g., a certain number of cryptocurrency units mined per hour). In a second example, powering cryptocurrency mining may include decreasing a rate of cryptocurrency mining such that a certain number of cryptocurrency units are mined per energy unit. Alternatively, the desired output may be based on a total cost of mining for the predicted duration such that the total cost does not exceed a threshold amount which may be set by an owner of the cryptocurrency mining device, for example.

Determining if sufficient energy is stored for powering cryptocurrency mining for the determined duration may include monitoring a level of energy stored in the energy storage device, predicting how much energy (e.g., how many energy units) may be used to maintain the current cryptocurrency mining rate or requested cryptocurrency output, predicting potential changes in the cryptocurrency mining rate based on conditions of the cryptocurrency mining device (e.g., device temperature), and so on. The energy storage device may be determined to have sufficient energy stored when an amount of energy stored by the energy storage device is greater than or equal to a predicted amount of energy used to power mining in the predicted duration (e.g., until time t1).

If it is determined at 406 that sufficient energy is stored to power cryptocurrency mining for the determined duration, at 408, method 400 includes using stored energy for cryptocurrency mining until a cost of energy is less than the cost of energy at time t0 or until stored energy is depleted.

The duration predicted at 404 may be an accurate estimation of when energy costs may decrease and, at time t1, the cost of energy may be less than the cost of energy at time t0. In this example, a quantity of energy may remain stored in the energy storage device if the determination that sufficient energy was stored at 406 included that more energy was stored than predicted to be used to power operation for the predicted duration. Alternatively, energy stored in the energy storage device may be depleted during the estimated duration and, at time t1 where the energy cost is less than energy cost at t0, a quantity of energy stored in the energy storage device may be zero. The cost of energy may be less than the cost of energy at time t0 prior to time t1, in one example, due to an unpredicted weather event, which may cause more energy to be generated (e.g., more wind than predicted, therefore more wind energy), thus lowering the cost of energy at a time earlier than the predicted duration.

In another example, energy stored in the energy storage device may be used for mining during the predicted duration until stored energy is depleted. Stored energy may be depleted prior to time t1 if unpredicted events (e.g., storms, power outage, etc.) occur during the duration that resulted in more stored power being used for cryptocurrency mining than was predicted may be used to power mining.

When either of the above-described situation occur, method 400 proceeds to 410, where method 400 includes determining if the current energy cost is greater than the predicted energy cost. If current cost is less than energy cost at t0, method 400 proceeds to 412 where method 400 includes returning to nominal monitoring of operating conditions. This may include monitoring current energy costs, predicting future energy costs based on internal inputs (e.g., from the mining system) and external inputs (e.g., from the cloud network) and comparing current and predicted costs to determine when to repeat method 400.

If stored energy was determined to be depleted at 408 and cost of energy is still greater than at time t0 as determined at 410, method 400 returns to 404 to predict a duration until the cost is less than or equal to t0. The cost of energy at time t1 may still be greater than the cost of energy at time t0, for example, when an unpredicted energy demand amount occurs during the duration (e.g., between t0 and t1), resulting in increased energy cost. The predicted duration may be a same duration or a different duration compared to the first determined duration (e.g., from t0 to t1). As stored energy may have been depleted (e.g., as determined at 408), at 406, it may be determined that sufficient energy is not stored and method 400 proceeds to 414.

Alternatively, method 400 may proceed from 406 directly to 414 in conditions where sufficient energy is not stored to power cryptocurrency mining for the desired duration. Though a quantity of energy may be stored in the energy storage device, the quantity may not be sufficient to power mining for the predicted duration, as described above. Method 400 proceeds to 414.

At 414, method 400 includes using available stored energy (if available), then using incoming energy, for cryptocurrency mining. The cryptocurrency mining device may deplete energy stored by the energy storage device while powering cryptocurrency mining. Once stored energy is depleted, the cryptocurrency mining device may use energy input from an external source, such as the low or no-carbon energy source, to power cryptocurrency mining. In one example, since cost of energy is high (e.g., predicted cost of energy is less than current energy cost) and mining may be cost inefficient, a threshold amount of energy to be used from the external energy source may be implemented, such that an amount of energy from the external energy source is not exceeded to maintain costs of mining below a threshold cost. In another example, the method of FIGS. 3A-3B may be implemented to determine percentages of energy from the external source to use for mining, storage, to be sold, or to be dumped. In this example, energy may be stored if the cost of energy is predicted to be greater than the cost of energy at t0 for a time greater than a desired time determined by the owner of the mining system, by the mining system manufacturer, and so on.

At 416, method 400 includes determining if the cost of energy is less than the cost of energy at t0. Cost of energy may be monitored for the above-determined duration (e.g., at 404) and the cost of energy at time t1 may be compared to cost of energy at time t0, for example. If the cost of energy is greater than the cost of energy at t0, method 400 returns to 414 and uses stored energy until the energy storage device is depleted, then uses incoming energy for cryptocurrency mining. If the current energy cost is less than the energy cost at t0, method 400 proceeds to 412. As described above, at 412, method 400 includes returning to nominal monitoring of operating conditions, and method 400 returns to 402.

The methods described in FIGS. 3A-3B and FIG. 4 provide two examples of methods for managing energy consumption during cryptocurrency mining, however other methods are possible. For example, the control unit may direct the cryptocurrency mining device to use energy stored in the energy storage device in conditions where the current cryptocurrency value is greater than, less than, or equal to current energy costs. In this example, the control unit may direct the cryptocurrency mining device to use a first percentage of stored energy and a second percentage of input energy for mining.

FIG. 5 shows an example graph 500 illustrating dynamic energy distribution for managing energy consumption during cryptocurrency mining. The graph 500 is described in relation to method 300 of FIGS. 3A-3B, but may also show energy distribution as directed by other methods used to manage energy consumption of cryptocurrency mining.

The graph 500 includes a first plot 502, a second plot 504, a third plot 506, and a fourth plot 508. The first plot 502 represents a current cryptocurrency value, the second plot 504 represents a current energy cost, the third plot 506 represented a predicted cryptocurrency value, and the fourth plot 508 represents a predicted energy cost. Current and predicted values and costs may be determined by remote servers, the internet, or other public domains and input to the control unit via the cloud network or may be determined by the control unit based on inputs from the cloud network and from the mining device, as described in FIGS. 2, 3A, and 3B. For the first through fourth plots, the graph 500 includes ordinates representing values from low to high, moving up the ordinate for each plot.

The graph 500 also includes a fifth plot 510, a sixth plot 512, a seventh plot 514, and an eighth plot 516. The fifth plot represents a percentage of incoming energy to be directed to the cryptocurrency mining device for cryptocurrency mining, the sixth plot represents a percentage of incoming energy to be directed to the energy storage device, the seventh plot represents a percentage of energy to be sold to the third party, and the eighth plot represents a percentage of energy to be dumped to ground. Incoming energy may be input to the mining system by the low or no-carbon energy source, as described in FIG. 2. For the fifth through eighth plots, the graph 500 includes ordinates representing percentages of energy to be directed to each element from 0 to 100%, moving up the ordinate for each plot.

For the first through eighth plots of graph 500, the abscissa shows time increasing from left to right and time markers t1, t2, t3, t4, and t5 representing durations of interest. Hash marks between each of the markers t1, t2, t3, t4, and t5 indicate that each of the durations of interest may occur at different points in time and are not directly subsequent, for example, a duration between time t1 and time t2 may be greater than, less than, or equal to a duration between time t3 and t4.

The percentages shown by each of the fifth through eighth plots represent signals sent from the control unit which indicate approximately how much energy is to be directed to each element. The sum of percentages for each of the fifth through eighth plots at each duration of interest (e.g., the fifth through eighth plots for t1) is equal to 100%. However, different percentages (e.g., different than the percentages indicated by control unit signals) may be directed to each element in reality due to energy lost in transit (e.g., from the low or no-carbon energy source to the relative elements).

The examples shown in FIG. 5 are non-limiting and other distributions of energy may be possible and fall within the scope of the present disclosure. Additionally, the examples shown in FIG. 5 illustrate relative percentages of total energy to be used for mining or to be sold, stored, or dumped. Actual percentages for the given examples may fall within the relative amounts as decided by modeling based on historic data and future predictions, or may be percentages other than the relative percentages described herein.

Turning now to time t1, a first example distribution of energy is shown. Comparison of the first plot 502 and the second plot 504 show that cryptocurrency value is greater than the cost of energy. Comparison of the second plot 504 and the fourth plot 508 show that current energy cost is equal to predicted energy cost (e.g., the fourth plot 508 is obscured by the second plot 504). Predicted cryptocurrency value, as shown by the third plot 506, is equal to current cryptocurrency value (e.g., the third plot 506 is obscured by the first plot 502). Therefore, 100% of incoming energy is directed to the cryptocurrency mining device to be used for mining, as shown by the fifth plot 510. In this example, the control unit may not direct energy to be stored, sold, or dumped, as it may be determined that using 100% of energy for mining may result in increased total returns.

At time t2, a second example distribution of energy is shown. Comparison of the first plot 502 and the second plot 504 show that cryptocurrency value is greater than cost of energy. Comparison of the first plot 502 and the third plot 506 show that current cryptocurrency value is less than predicted cryptocurrency value. Comparison of the second plot 504 and the fourth plot 508 show that current energy cost is less than predicted energy cost. The fifth plot 510 and the sixth plot 512 therefore show that approximately equal percentages of total energy are used for storage and for mining, where the percentages sum to 100%. Since cost of energy is predicted to be higher when cryptocurrency value is higher, stored energy may be used for future mining instead of buying higher-costing energy.

Under the same conditions as described at time t2 (e.g., current/predicted cryptocurrency value and energy cost), different percentages of energy to be directed to be stored and to be used for mining may be applied based on which distribution is determined to be most cost efficient and may increase total returns (e.g., using logic, game theory, Monte Carlo-style simulation, and so on as described in FIGS. 3A-3B).

At time t3, a third example distribution of energy is shown. Comparison of the first plot 502 and the second plot 504 show that cryptocurrency value is greater than cost of energy. Comparison of the first plot 502 and the third plot 506 show that current cryptocurrency value is less than predicted cryptocurrency value. Comparison of the second plot 504 and the fourth plot 508 show current energy cost is greater than predicted energy cost. In this example, a first percentage of energy is used for mining, as shown by the fifth plot 510 and a second percentage of energy is sold, as shown by the seventh plot 514. The first and the second percentage sum to 100% of input energy. The first percentage may be a quantity of energy used by the mining device for efficient mining, where mining efficiency may be determined and preset or adjusted by the mining device owner, manufacturer, or a governing group. As the cost ratio is predicted to be lower in the future (e.g., it may cost less energy to mine the same quantity of cryptocurrency, which may have a higher value), selling excess energy (e.g., energy not used for efficient mining) at time t2 may result in profits from both cryptocurrency mining and sold excess energy.

At time t4, a fourth example distribution of energy is shown. Comparison of the first plot 502 and the second plot 504 show that current cryptocurrency value is less than current energy cost. Comparison of the first plot 502 and the third plot 506 show that current cryptocurrency value is less than predicted cryptocurrency value. Comparison of the second plot 504 and the fourth plot 508 show current cost of energy is greater than predicted cost of energy. As a result, the fifth plot 510 shows a first percentage being used for mining and the seventh plot 514 shows a second percentage to be sold, where the second percentage is greater than the first percentage and the first and second percentage sum to 100%. Although it may be cost inefficient to mine (e.g., cost of energy is greater than value of cryptocurrency), the control unit may direct some energy to the mining device such that mining continues, though cryptocurrency output may not be increased. Still, energy consumption may be managed and total returns may be increased, as the mining system may profit from selling energy when energy costs are high. The control unit may adjust percentages to those described in previous examples when it is cost efficient to mine.

At time t5, a fifth example distribution of energy is shown. Comparison of the first plot 502 and the second plot 504 show that current cryptocurrency value is less than current energy cost. Comparison of the first plot 502 and the third plot 506 show current cryptocurrency value is less than predicted cryptocurrency value. Comparison of the second plot 504 and the third plot 506 show current energy cost is less than predicted energy cost. Under these conditions, a first percentage of energy may be used for mining, as shown by the fifth plot 510, a second percentage may be stored as shown by the sixth plot 512, and a third percentage of energy may be dumped to ground, as shown by the eighth plot 516. The second percentage may be greater that the first percentage. Similarly to the fourth example, a quantity of energy may be provided to the mining device such that cryptocurrency mining may continue, albeit at a lower rate than in examples where mining is cost efficient (e.g., cryptocurrency value is greater than energy cost). Energy may be dumped to ground when, as is the example described a time t5, current cost of energy is lower than predicted cost of energy (e.g., current low energy demand), in which case the owner of the energy storage device may pay a third party to take excess energy. The control unit may direct the second percentage of energy to the energy storage device and, when the energy storage device is full, the third percentage of energy may be dumped to ground.

The first through fifth examples described above may be some examples of how incoming energy is directed to be distributed by the control unit to elements of the energy management system. Other examples may be implemented that result in cost efficient energy distribution with increased total returns, as determined by logic, artificial intelligence, Monte Carlo-style simulation, and so on, integrated in the energy consumption module of the control unit.

As energy may be constantly input to the cryptocurrency mining device by the low or no-carbon energy source or from the energy storage device, cryptocurrency mining may be constantly active. Thus, adjustments to energy distribution, (e.g., percentages of energy used to for mining or directed to be sold, stored, or dumped; changes in an energy source; and so on), may be constantly made to manage energy consumption for cryptocurrency mining. These adjustments may be made based on current and predicted conditions, including cost of energy and cryptocurrency value. These conditions may be influenced by factors such as energy production (e.g., weather conditions for renewable energy sources), mining conditions (e.g., climate of miner), crypto market (e.g., demand, legality), and so on. Additionally, energy distribution may change based on an artificial intelligence or logic system that learns patterns such as weather conditions, times of day/month/year where total returns on cryptocurrency mining are increased and adjusts energy distribution based on learned patterns.

Further, the control unit may conduct post-action measurements of yield (e.g., following each adjustment of signals or at a regular time interval) to determine efficiency of the mining system and inform the learning system (e.g., logic or AI) to increase total returns of future method applications. Pre-determined thresholds may also be implemented to the control unit by the owner of the mining device, the owner of the energy storage device, governing agencies, and so on, such that programmatic settings (e.g., method 300 of FIGS. 3A-3B, method 400 of FIG. 4, or other implemented methods not described herein) may be overridden during circumstances where thresholds are exceeded. For example, if an extreme weather event occurs (e.g., hurricane, tornado, etc.), cryptocurrency mining may be signaled to stop by the control unit so that energy stored in the energy storage device and energy from the low or no-carbon energy source may be used to power homes, businesses, and other infrastructure.

In this way, energy consumption of cryptocurrency mining may be managed by co-locating an energy storage device with a cryptocurrency mining device and implementing methods wherein energy consumption and rate of cryptocurrency mining may be adjusted based on current and predicted cryptocurrency values, current and predicted energy costs, predicted energy demand patterns, and other factors. These factors may be determined based on environmental conditions, such as weather, temperature, and so on, which may influence renewable energy availability timing and amounts, and further based on market conditions influencing both energy cost and cryptocurrency value. Factors may be input to a logic system, AI, Monte Carlo-style simulation, or other computational method used to determine operating conditions of the mining system which may result in increased total returns. Additionally, the cryptocurrency mining device may use electrical energy, which may be stored by the energy storage device for later use. Use of the energy device thus allows for time-shifting between when energy is generated and when it is consumed (e.g., used for cryptocurrency mining).

The technical effect of using a co-located energy storage device and cryptocurrency mining device and using a low or no-carbon energy source to power cryptocurrency mining is that operation of the cryptocurrency mining device may be adjusted for continuous management of energy consumption for low or no-carbon cryptocurrency mining.

The disclosure also provides support for a method for managing an energy storage system, comprising: directing stored energy in the energy storage system to a cryptocurrency mining system and another consumer responsive to conditions. In a first example of the method, the method further comprises directing available energy for storage to the energy storage system and to the cryptocurrency mining system responsive to conditions. In a second example of the method, optionally including the first example, the conditions include an operating condition of the energy storage system. In a third example of the method, optionally including one or both of the first and second examples, the conditions include an estimate of energy availability for storage. In a fourth example of the method, optionally including one or more or each of the first through third examples, the conditions include an amount of consumer demand. In a fifth example of the method, optionally including one or more or each of the first through fourth examples, the cryptocurrency mining system and the energy storage system are co-located. In a sixth example of the method, optionally including one or more or each of the first through fifth examples, available energy for storage is cyclically available renewable energy, and the directing for storage and directing to the cryptocurrency mining system and the another consumer are based on a timing of availability of cyclically available renewable energy. In a seventh example of the method, optionally including one or more or each of the first through sixth examples, the directing for storage and directing to the cryptocurrency mining system and the another consumer are based on a timing of availability of cyclically available renewable energy are responsive to user settings. In an eighth example of the method, optionally including one or more or each of the first through seventh examples, the directing for storage and directing to the cryptocurrency mining system and the another consumer are based on an adaptive learning of timing of availability and an available amount of cyclically available renewable energy and adaptive learning of timing of demand and a demand amount of the cryptocurrency mining system and the another consumer. In a ninth example of the method, optionally including one or more or each of the first through eighth examples, the directing for storage and directing to the cryptocurrency mining system and the another consumer are based on a timing of availability of cyclically available renewable energy are further responsive to override conditions set by a user.

The disclosure also provides support for a method for managing an energy storage system, comprising: directing available energy for storage to the energy storage system and to a cryptocurrency mining system responsive to conditions. In a first example of the method, the method further comprises: directing stored energy in the energy storage system to the cryptocurrency mining system and another consumer responsive to renewable energy availability timing and amounts, demand patterns, energy costs, and cryptocurrency economic value. In a second example of the method, optionally including the first example, the conditions include an operating condition of the energy storage system. In a third example of the method, optionally including one or both of the first and second examples, the conditions include an estimate of energy availability for storage. In a fourth example of the method, optionally including one or more or each of the first through third examples, the conditions include an amount of consumer demand. In a fifth example of the method, optionally including one or more or each of the first through fourth examples, the cryptocurrency mining system and the energy storage system are co-located.

The disclosure also provides support for an energy storage system comprising: a consumer, a flow battery, a cryptocurrency mining system, and a controller configured with computer-readable instructions stored on non-transitory memory that when executed cause the controller to: adjust energy flow to each of the consumer, the flow battery, and the cryptocurrency mining system based on user settings, operating conditions, and renewable energy source availability. In a first example of the system, the cryptocurrency mining system and the flow battery are co-located. In a second example of the system, optionally including the first example, the flow battery is physically integrated into the cryptocurrency mining system. In a third example of the system, optionally including one or both of the first and second examples, the controller is in communication with a cloud network and wherein the cloud network inputs renewable energy source availability information to the controller.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for managing an energy storage system, comprising:
receiving inputs and performing programmatic calculations using the inputs, wherein the inputs include a current cryptocurrency economic value and a future cryptocurrency economic value;
wherein performing the programmatic calculations using the inputs comprises:
comparing the current cryptocurrency economic value with a current energy cost of mining cryptocurrency;
determining if mining the cryptocurrency is cost-efficient, wherein mining the cryptocurrency is cost-efficient when the current cryptocurrency economic value is greater than the current energy cost of mining cryptocurrency or when the future cryptocurrency economic value is greater than the current energy cost of mining cryptocurrency;
responsive to determining that mining the cryptocurrency is cost-efficient, determining a first percentage of energy to use for mining and a second percentage of energy to store based on the programmatic calculations;
responsive to determining that mining the cryptocurrency is not cost-efficient, determining a third percentage of energy to use for mining and a fourth percentage of energy to store; and
responsive to determining that an available amount of storage in the energy storage system is less than a threshold amount, determining an amount of energy to discharge, wherein the amount of energy to discharge comprises a seventh percentage of energy to be sold and an eighth percentage of energy to be dumped;
the method further comprising directing stored energy in the energy storage system to the cryptocurrency mining system based on the first percentage or the third percentage and to another consumer based on the seventh percentage of energy;
wherein the third percentage is greater than zero but less than the first percentage.

2. The method of claim 1, wherein the inputs include an operating condition of the energy storage system.

3. The method of claim 1, wherein the inputs include an estimate of energy availability for storage.

4. The method of claim 1, wherein the inputs include an amount of consumer demand.

5. The method of claim 1, wherein the cryptocurrency mining system and the energy storage system are co-located.

6. The method of claim 1, wherein available energy for storage is cyclically available renewable energy, and the first percentage, the second percentage, the third percentage, the fourth percentage, the seventh percentage, and the eighth percentage are based on a timing of availability of cyclically available renewable energy.

7. The method of claim 1, wherein the first percentage, the second percentage, the third percentage, the fourth percentage, the seventh percentage, and the eighth percentage are based on a timing of availability of cyclically available renewable energy responsive to user settings.

8. The method of claim 1, wherein the first percentage, the second percentage, the third percentage, the fourth percentage, the seventh percentage, and the eighth percentage are based on an adaptive learning of timing of availability and an available amount of cyclically available renewable energy and adaptive learning of timing of demand and a demand amount of the cryptocurrency mining system and the another consumer.

9. The method of claim 1, wherein the first percentage, the second percentage, the third percentage, the fourth percentage, the seventh percentage, and the eighth percentage are based on a timing of availability of cyclically available renewable energy and are further responsive to override conditions set by a user.

10. A method for managing an energy storage system, comprising:
directing available energy for storage to the energy storage system and to a cryptocurrency mining system responsive to conditions, including operating the energy storage system while it is cost effective to mine and, during the operation where it is cost effective to mine, directing a first percentage of energy to the cryptocurrency mining system; and operating the energy storage system while it is not cost effective to mine and, during the operating where it is not cost effective to mine, directing a second percentage of energy towards the cryptocurrency mining system, wherein the second percentage is greater than zero and less than the first percentage.

11. The method of claim 10, further comprising directing stored energy in the energy storage system to the cryptocurrency mining system and another consumer responsive to renewable energy availability timing and amounts, demand patterns, energy costs, and cryptocurrency economic value.

12. The method of claim 11, wherein the conditions include an operating condition of the energy storage system.

13. The method of claim 11, wherein the conditions include an estimate of energy availability for storage.

14. The method of claim 11, wherein the conditions include an amount of consumer demand.

15. The method of claim 11, wherein the cryptocurrency mining system and the energy storage system are co-located.

16. An energy storage system, comprising:
    a consumer, wherein the consumer is an individual or business that uses energy;
    an energy storage device;
    a cryptocurrency mining system; and
    a controller configured with computer-readable instructions stored on non-transitory memory that when executed cause the controller to:
        predict a predicted energy cost for a future point in time using weather predictions of weather events and historic power demands during the weather events;
        predict a predicted cryptocurrency value based on market conditions; and
        adjust energy flow to each of the consumer, the energy storage device, and the cryptocurrency mining system based on user settings, operating conditions, and renewable energy source availability,
    wherein the controller adjusts 100% of the energy to the cryptocurrency mining system in response to a current cryptocurrency value and the predicted cryptocurrency value each being greater than a current energy cost and the predicted energy cost, and
    wherein the controller adjusts energy flow to be divided between the cryptocurrency mining system and the energy storage device in response to the current cryptocurrency value being greater than the current energy cost, the predicted cryptocurrency value being higher than the current cryptocurrency value, and the current energy cost lower than the predicted energy cost; and
    wherein the controller adjusts energy to be discharged when the energy storage device is full, wherein discharging energy includes selling the energy to the consumer or dumping the energy to ground or to a power grid.

17. The energy storage system of claim 16, wherein the cryptocurrency mining system and the energy storage device are co-located.

18. The energy storage system of claim 16, wherein the energy storage device is physically integrated into the cryptocurrency mining system.

19. The energy storage system of claim 16, wherein the controller is in communication with a cloud network, and wherein the cloud network inputs renewable energy source availability information to the controller.

20. The method of claim 1, wherein the predicted cryptocurrency economic value is based on adaptive learning of market conditions.

* * * * *